United States Patent
Dominick et al.

(10) Patent No.: US 11,274,968 B2
(45) Date of Patent: Mar. 15, 2022

(54) SPARK EMISSION SPECTROMETER WITH SEPARABLE SPARK CHAMBER

(71) Applicant: Elementar Analysensysteme GmbH, Langenselbold (DE)

(72) Inventors: Hans Dominick, Kleve (DE); Michael Molderings, Kerken (DE)

(73) Assignee: Elementar Analysensysteme GmbH, Langenselbold (DE)

(*) Notice: Subject to any disclaimer, the term of this patent is extended or adjusted under 35 U.S.C. 154(b) by 0 days.

(21) Appl. No.: 17/048,081

(22) PCT Filed: May 2, 2019

(86) PCT No.: PCT/EP2019/061234
§ 371 (c)(1),
(2) Date: Oct. 15, 2020

(87) PCT Pub. No.: WO2019/211374
PCT Pub. Date: Nov. 7, 2019

(65) Prior Publication Data
US 2021/0285820 A1    Sep. 16, 2021

(30) Foreign Application Priority Data
May 4, 2018  (DE) .......................... 102018110767.6

(51) Int. Cl.
G01J 3/443   (2006.01)
G01J 3/02    (2006.01)
G01N 21/67   (2006.01)
G01J 3/10    (2006.01)

(52) U.S. Cl.
CPC ............ *G01J 3/443* (2013.01); *G01J 3/0202* (2013.01); *G01J 3/0208* (2013.01); *G01J 3/10* (2013.01); *G01N 21/67* (2013.01)

(58) Field of Classification Search
CPC ...... G01J 3/0202; G01J 3/0205; G01J 3/0208; G01J 3/0291; G01J 3/10; G01J 3/443; G01N 21/67
See application file for complete search history.

(56) References Cited

U.S. PATENT DOCUMENTS 3,543,077 A   11/1970  Grimm
8,355,126 B2  1/2013   Goulter et al.
(Continued)

FOREIGN PATENT DOCUMENTS

| DE | 000002429388 A1 | 12/1960 |
| DE | 1589389 C       | 10/1971 |
| DE | 10163619 B4     | 7/2003  |
| DE | 102005058160 A1 | 6/2007  |

(Continued)

OTHER PUBLICATIONS

International Search Report of PCT/EP2019/061234 Completed Jun. 7, 2019; dated Jun. 18, 2019 3 pages.
(Continued)

*Primary Examiner* — Hina F Ayub
(74) *Attorney, Agent, or Firm* — The Roy Gross Law Firm, LLC; Roy Gross

(57) ABSTRACT

The invention relates to an optical emission spectrometer with a spark chamber (10) which comprises a spark stand opening (14) and an oblong electrode (11) being arranged inside thereof for generating a spark and a beam of light originating therefrom. Furthermore, a coupling unit (20) is provided which comprises at least one window being arranged on a window holder and a channel. The spark chamber (10) and the coupling unit (20) are arranged with respect to each other such that the beam of light falls through the window (30) into the channel (21). In addition, the spark chamber (10) and the coupling unit (20) comprise means for purging with an inert gas.
The spark chamber (10) is directly connected with a window holder (31) and via the window holder (31) with the cou-
(Continued)

pling unit (20), wherein between spark chamber (10) and window holder (31) a sealing element (33) is provided. The coupling unit (20) comprises at least one elastic means which is arranged such that it presses the window holder (31) against the spark chamber (10).

8 Claims, 1 Drawing Sheet

(56) References Cited

U.S. PATENT DOCUMENTS

| | | | |
|---|---|---|---|
| 2004/0051866 A1 | 3/2004 | Eklin et al. | |
| 2008/0212074 A1* | 9/2008 | Goulter | G01J 3/36 356/51 |
| 2013/0148118 A1* | 6/2013 | Dorier | G01J 3/10 356/313 |

FOREIGN PATENT DOCUMENTS

| | | |
|---|---|---|
| DE | 102015002104 A1 | 8/2016 |
| GB | 867973 A | 5/1958 |
| GB | 967047 A | 8/1964 |

OTHER PUBLICATIONS

English Translation of International Search Report of PCT/EP2019/061234 Completed Jun. 7, 2019; dated Jun. 18, 2019 2 pages.
Written Opinion of PCT/EP2019/061234 Completed Jun. 7, 2019; dated Jun. 18, 2019 6 pages.

* cited by examiner

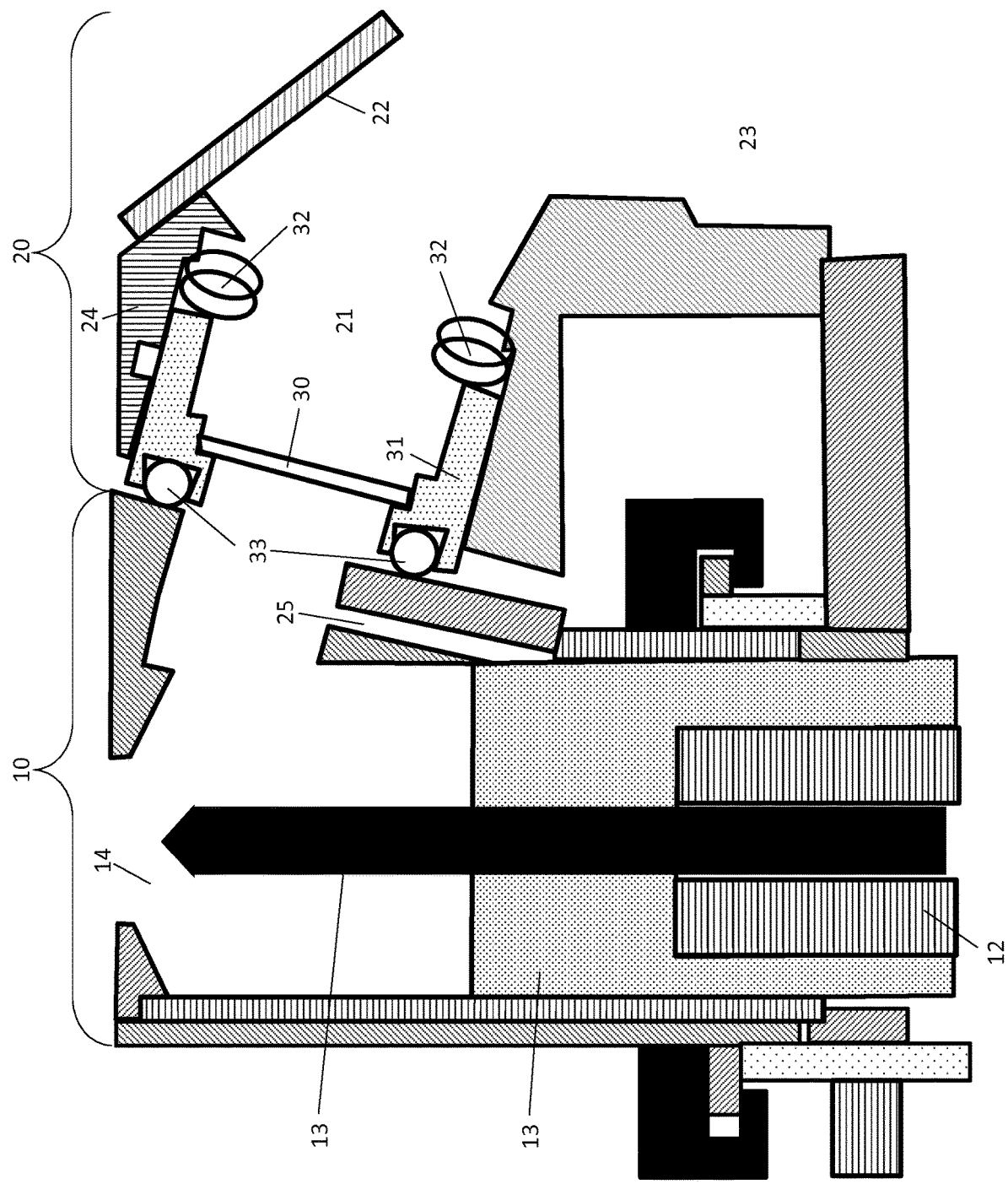

SPARK EMISSION SPECTROMETER WITH SEPARABLE SPARK CHAMBER

CROSS REFERENCE TO RELATED APPLICATIONS

This application is a National Phase of PCT Patent Application No. PCT/EP2019/061234 having International filing date of May 2, 2019, which claims the benefit of priority of German Patent Application No. 10 2018 110 767.6 filed on May 4, 2018. The contents of the above applications are all incorporated by reference as if fully set forth herein in their entirety.

The present invention relates to an optical emission spectrometer with a spark chamber which comprises a spark stand opening and an oblong electrode being arranged inside thereof for generating a spark and a beam of light originating therefrom, and with a coupling unit which comprises at least one window being arranged on a window holder and a channel, wherein the spark chamber and the coupling unit are arranged with respect to each other such that the beam of light falls through the window into the channel.

An emission spectrum is the electromagnetic spectrum which is emitted from atoms, molecules and/or materials without irradiation of electromagnetic radiation of the same frequency. Here, at first, atoms and/or ions through supplying energy in form of the spark are excited from their energetic ground state into an energetically higher state. With the already mentioned spontaneous emission of energy, then they return into their energetic ground state. While the emission spectrum of atoms, molecules or diluted gases is a line spectrum, hot solids and liquids emit a continuous spectrum. A reason for that is that the single atoms in addition interact with each other and so the discrete quantum states merge into one another.

The spark emission spectrometry belongs to the group of optical emission spectrometry. It is in particularly used for the identification of metal alloys. So, qualitative statements can be made, because the energy differences, in particular according to Planck's law, with respect to the wave length are specific for elements and so each element has its own characteristic line spectrum. Quantitative statements can be made, because the intensity of the measured radiation is proportional to the number of the present atoms or ions.

In the case of spark emission spectrometry, the required energy for the evaporation of the sample and the subsequent dissociation and/or ionization and finally the excitation is normally generated by a unipolar medium voltage spark discharge with spark sequence frequencies of up to 1000 Hz. Normally, this happens between two electrodes. Here, the anode is an electrode which is permanently installed in the spectrometer, whereas the sample to be analyzed is used as a cathode.

For that the sample itself has to be electrically conductive which either is an inherent material property or is achieved by compressing the powdery material to be analyzed with an electrically conductive material, such as e.g. graphite. Normally, argon is used as discharge atmosphere.

The sparking process itself consists of several steps: In the pre-sparking time during which several thousands of single spark discharges remelt a part of the sample surface, the latter is homogenized. So perceived influences can be removed and inclusions can at least partially be dissolved.

It is optimal, when the pre-sparking time ends in the so-called stationary sparking state, thus exactly at the time point, when the sample surface is homogenized such that the measured intensities of the analysis lines do no longer change over time. When such a stationary state is achieved, after the pre-sparking time the integration time follows, during which in the classic spark emission spectrometry the intensities of several thousands of single with photo-sensitive sensors, in particular CMOS sensors or photomultipliers (PMT) are measured and subsequently integrated which finally results via a calibration in an output of mass proportions.

The structure of such a spark emission spectrometer is for example described in DE 10 2015 002 104 A1 which provides an excitation generator with improved electrical efficiency.

DE 10 2005 058 160 A1 shows the connection between the actual spark chamber and the spectrometer optics.

Especially in the case of mobile apparatuses of spark spectroscopy, but also in the stationary sector at least a part of the optical system, the so-called UV optics, is often purged with argon or another inert gas for making the UV optics transparent for light with wave lengths <220 nm. Normally, here, argon is used as protective gas atmosphere.

In addition, it is common that the spark head or the spark chamber has a replacement design and can be removed for purification. For allowing this modular accessibility, the spark head and the UV optics are separated from each other by a window. But, between the windows a small air gap is formed which is not purged with argon. Representative examples of this construction type are the SPECTROTEST® or the SPECTROPORT® of the company SPECTRO Analytical Instruments GmbH. The air contained therein absorbs UV radiation and influences so the measuring result.

Therefore, it is an object of the present invention to prevent that here inside the spark spectrometer air inclusions arise.

This object is solved with an optical emission spectrometer having the features of patent claim 1.

Such an emission spectrometer comprises, on the one hand, a spark chamber in which at least one electrode is arranged inside thereof which is preferably oriented into the direction of a spark stand opening. During operation the sample to be measured rests on the spark stand opening. From the electrode a spark is generated into the direction of this sample so that from this spark a beam of light emanates.

Furthermore, the optical emission spectrometer comprises a coupling unit which comprises at least one window being arranged on a window holder and a channel. Spark chamber and coupling unit are arranged with respect to each other such that the beam of light generated falls through the window into the channel.

Both, spark chamber and coupling unit, can preferably be purged with an inert gas, because so the absorption through air can be avoided.

The subject matter of the invention is that during operation the spark chamber is directly connected with the window holder and via the window holder with the coupling unit. Between spark chamber and window holder a sealing element is provided. The coupling unit comprises at least one elastic means which is arranged such that is presses the window holder against the spark chamber. So, the coupling unit can gas-tightly be sealed via the window with the spark chamber. So, each form of air inclusions and the falsification of the measuring results caused through them can be prevented.

In a preferred design of the invention the sealing element has a combined axial and radial sealing effect so that both, entering of air to the inside and escaping of the atmosphere to the outside, can reliably be prevented.

Here, it is particularly preferable, when the sealing element is an O-ring. Diverse embodiments of such 0-rings are available on the market. Normally, they consist of rubber. So, they are a cost-efficient seal which can easily be exchanged.

Furthermore, it has been shown to be preferable, when in the window holder and/or the spark chamber a flute is provided into which the sealing element can be inserted. This facilitates a resealing procedure after a movement of the spark head or an exchange of the sealing material.

In addition or in an alternative, it has been shown to be advantageous, when the window holder is manufactured from brass. This material is characterized by advantageous manufacturing properties and it also complies with the profile of requirements of the optical emission spectroscopy during operation.

In this connection it is also preferred, when the window in the window holder is manufactured from $MgF_2$ or from quartz. Typically, this material hardly influences spectra which are obtained in the optical emission spectroscopy.

In another preferred design the elastic means which presses the window holder against the spark chamber is at least a pre-stressed metal part which thus also provides the advantage of simple manufacturing. In this connection the design of the at least one elastic means as spring steel is particularly positive.

In a further preferred embodiment, the coupling unit comprises a mirror which is arranged such that it redirects the beam of light coming from the channel by 25 to 70°, preferably by 40 to 50° into a second channel. This results in the advantage of a more compact construction type of the whole emission spectrometer.

It has also been shown to be advantageous, when the electrode is held by an electrode collet chuck. So, the electrode can be replaced in a relatively simple manner.

Preferably, the electrode collet chuck is arranged in a sleeve made of an isolation material which for example is Teflon or ceramic. So, spark flashovers from the electrode can be prevented.

Finally, it is preferred, when the spark chamber is fixed with a holding device. This for example can be achieved by a lock-in-place region or a thread.

Further features, advantages and application possibilities of the invention also follow from the description of the figure below. Here, all described and/or visually illustrated features on their own or in arbitrary combination form the subject matter of the invention, independently of their summary in the patent claims or their backreferences.

Shown is:

in FIG. 1 the structure of an optical emission spectrometer according to the present invention.

The spark chamber or spark head 10 comprises in its interior an electrode 11 onto which a voltage can be applied which is not shown so that this electrode 11 during operation functions as anode. This electrode 11 is inserted in the electrode collet chuck 12 which is preferably manufactured from brass. The electrode collet chuck is surrounded by an isolation body 13 which is preferably manufactured from Teflon or ceramic.

Furthermore, in the spark chamber 10, preferably opposite to the electrode 11, a spark stand opening 14 is provided onto which during operation the sample to be measured is positioned. The whole spark head 10 is purged with inert gas, preferably argon.

During operation, then from the electrode 11 into the direction of this not shown sample several thousands of single sparks are generated so that a beam of light is formed.

The beam of light which is formed through that falls through the window 30 which preferably consists of magnesium fluoride or quartz, and from there it is guided into and reaches the coupling device 20. Preferably, there, through the channel 21 circumscribed by housing 24 it reaches the mirror 22 which redirects the beam of light into a second channel 23. The whole way of the light within the coupling unit 20 consisting of the first and the second channels 21, 23 is also purged with inert gas which is preferably injected via a channel for feeding in inert gas 25.

The window is fixed by means of a window holder 31. Preferably, the window holder 31 is manufactured from brass. This window holder 31 abuts on at least one elastic means 32, preferably a spring steel, which ensures that the window holder 31 is permanently pressed into the direction of spark chamber 10.

Furthermore, between spark chamber 10 and window holder 31 a sealing element 33, preferably an O-ring, is present for guaranteeing a sealing effect between window holder 31 and spark chamber 10. The back-pressure of the elastic means 32 in combination with the sealing element 33, e.g. the O-ring, results in a gas-tight sealing of spark chamber 10 and coupling unit 20. This back-pressure is guaranteed by fixing the spark chamber and/or the coupling unit 20, for example by screwing in into a thread and/or at least a lock-in device.

LIST OF REFERENCE SIGNS 10 spark chamber
11 electrode
12 electrode collet chuck
13 isolation body
14 spark stand opening
20 coupling unit
21 channel
22 mirror
23 second channel
24 housing
25 channel for feeding in inert gas
30 window
31 window holder
32 elastic means
33 sealing element
34 flute

The invention claimed is:

1. An optical emission spectrometer with a spark chamber (10) comprising:
a spark stand opening (14) and an oblong electrode (11) being arranged inside thereof for generating a spark and a beam of light originating therefrom, and with a coupling unit (20) which comprises at least one window being arranged on a window holder (31) and a channel,
wherein the spark chamber (10) and the coupling unit (20) are arranged with respect to each other such that the beam of light falls through the window (30) into the channel (21),
wherein the spark chamber (10) and the coupling unit (20) comprise means for purging with an inert gas,
wherein the spark chamber (10) is directly connected with the window holder (31) and via the window holder (31) with the coupling unit (20),
wherein between the spark chamber (10) and the window holder (31) a sealing element (33) is provided, and wherein the coupling unit (20) comprises at least one elastic means which is arranged such that it presses the window holder (31) against the spark chamber (10).

2. The optical emission spectrometer of claim 1, wherein the sealing element (33) has a combined axial and radial sealing effect.

3. The optical emission spectrometer of claim 1, wherein the sealing element (33) is an O-ring.

4. The optical emission spectrometer of claim 1, wherein in the window holder (31) and/or spark chamber (10) a flute (34) is provided into which the sealing element (33) can be inserted.

5. The optical emission spectrometer of claim 1, wherein the window holder (31) is made of brass.

6. The optical emission spectrometer of claim 1, wherein the window (30) is made of $MgF_2$ or of quartz.

7. The optical emission spectrometer of claim 1, wherein the elastic means (32) is at least one pre-stressed metal part.

8. The optical emission spectrometer of claim 1, wherein the elastic means (32) is at least spring steel.

\* \* \* \* \*